US 8,137,527 B1

(12) United States Patent
Woods

(10) Patent No.: US 8,137,527 B1
(45) Date of Patent: Mar. 20, 2012

(54) CARBON DIOXIDE ISOLATION AND GENERATION

(75) Inventor: Richard Root Woods, Irvine, CA (US)

(73) Assignee: Primafuel, Inc., Long Beach, CA (US)

( * ) Notice: Subject to any disclaimer, the term of this patent is extended or adjusted under 35 U.S.C. 154(b) by 93 days.

(21) Appl. No.: 12/511,003

(22) Filed: Jul. 28, 2009

Related U.S. Application Data

(60) Provisional application No. 61/084,214, filed on Jul. 28, 2008.

(51) Int. Cl.
*C25B 1/00* (2006.01)
(52) U.S. Cl. .................................................. 205/555
(58) Field of Classification Search .................. 205/555
See application file for complete search history.

(56) References Cited

U.S. PATENT DOCUMENTS

| | | |
|---|---|---|
| 2,139,351 A | 12/1938 | Bejarano |
| 2,383,601 A | 8/1945 | Keim |
| 3,173,959 A | 3/1965 | Rittmeister |
| 3,832,392 A | 8/1974 | Imamura et al. |
| 4,032,458 A | 6/1977 | Cooley et al. |
| 4,035,271 A | 7/1977 | Nemtsov et al. |
| 4,036,905 A | 7/1977 | Kornfeld |
| 4,261,700 A | 4/1981 | Monick et al. |
| 4,369,096 A | 1/1983 | Seifert et al. |
| 4,658,068 A | 4/1987 | Hanin |
| 4,837,367 A | 6/1989 | Gustafson et al. |
| 5,214,219 A | 5/1993 | Casale et al. |
| 5,320,765 A | 6/1994 | Fetterman et al. |
| 5,387,720 A | 2/1995 | Neher et al. |
| 5,684,215 A | 11/1997 | Horn et al. |
| 5,772,013 A | 6/1998 | Kunz et al. |
| 5,865,985 A | 2/1999 | Desai et al. |
| 5,965,032 A | 10/1999 | Frede et al. |
| 5,990,323 A | 11/1999 | Clubb |
| 6,129,875 A | 10/2000 | Dassel et al. |
| 6,284,116 B1 | 9/2001 | Wiese et al. |
| 6,387,961 B1 | 5/2002 | Schneider et al. |
| 6,541,228 B1 | 4/2003 | Genders et al. |
| 6,562,315 B2 | 5/2003 | Korotkikh et al. |
| 6,642,399 B2 | 11/2003 | Boocock |
| 6,768,015 B1 | 7/2004 | Luxem et al. |
| 7,109,363 B2 | 9/2006 | Brunner et al. |
| 7,138,536 B2 | 11/2006 | Bournay et al. |
| 7,201,783 B2 | 4/2007 | Edlund |
| 7,601,858 B2 | 10/2009 | Cantrell et al. |
| 7,608,729 B2 | 10/2009 | Winsness et al. |
| 2005/0004401 A1 | 1/2005 | Barnicki et al. |

(Continued)

FOREIGN PATENT DOCUMENTS

DE 10245758 4/2004

(Continued)

OTHER PUBLICATIONS

Edgar et al., "Synthesis of Biodiesel via Acid Catalysis", *Ind. Eng. Chem. Res.*, 2005, 44, 5353-5363.

(Continued)

*Primary Examiner* — Edna Wong
(74) *Attorney, Agent, or Firm* — Ladas & Parry, LLP

(57) ABSTRACT

Methods and apparatus for collecting/concentrating carbon dioxide are disclosed. In addition, methods and apparatus for utilizing collected carbon dioxide in biofuel production and biomass cultivation are disclosed.

13 Claims, 11 Drawing Sheets

CO2 Absorber + Electrochemical Cell – H2 Based

U.S. PATENT DOCUMENTS

| | | |
|---|---|---|
| 2005/0274065 A1 | 12/2005 | Portnoff et al. |
| 2006/0021277 A1 | 2/2006 | Petersen et al. |
| 2006/0041153 A1 | 2/2006 | Cantrell et al. |
| 2006/0051274 A1* | 3/2006 | Wright et al. .......... 423/220 |
| 2006/0057058 A1 | 3/2006 | Dahl et al. |
| 2006/0074256 A1 | 4/2006 | Alasti et al. |
| 2006/0094890 A1 | 5/2006 | Sharma et al. |
| 2006/0258892 A1 | 11/2006 | Yamamoto et al. |
| 2007/0045125 A1* | 3/2007 | Hartvigsen et al. .......... 205/637 |
| 2007/0101640 A1 | 5/2007 | Tsuto et al. |
| 2007/0158270 A1 | 7/2007 | Geier et al. |
| 2007/0161095 A1 | 7/2007 | Gurin |
| 2007/0184541 A1 | 8/2007 | Karl et al. |
| 2007/0260079 A1 | 11/2007 | Fleisher |
| 2007/0277429 A1 | 12/2007 | Jackam et al. |
| 2008/0209799 A1 | 9/2008 | Woods et al. |
| 2009/0005614 A1 | 1/2009 | Hulteberg et al. |
| 2009/0012334 A1 | 1/2009 | Hulteberg et al. |
| 2009/0250412 A1 | 10/2009 | Winsness et al. |
| 2009/0259060 A1 | 10/2009 | Cantrell et al. |

FOREIGN PATENT DOCUMENTS

| | | |
|---|---|---|
| EP | 1778608 A | 5/2007 |
| EP | 1996685 A | 12/2008 |
| WO | WO 2006/023432 | 3/2006 |
| WO | WO 2007/053705 | 5/2007 |
| WO | WO 2007/071046 | 6/2007 |
| WO | WO 2007/098396 | 8/2007 |
| WO | WO 2008/006190 | 1/2008 |
| WO | WO 2008/029132 | 3/2008 |

OTHER PUBLICATIONS

Hiwale, et al., "Industrial Applications of Reactive Distillation: Recent Trends," International Journal of Chemical Reactor Engineering, vol. 2: R1 (2004).

ISR issued on the related PCT Application No. PCT/US2008/063798, dated Aug. 19, 2008.

ISR issued on the related PCT Application No. PCT/US2008/053359, dated May 23, 2008.

Jungermann, et al., "Glycerine: A Key Cosmetic Ingredient," table of contents, chapter 5 and chapter 7, New York, (1991).

Jungermann, et al., "Glycerine: A Key Cosmetic Ingredient," table of contents, chapters 2-4, New York, (1991).

Lotero, et al., "Synthesis of Biodiesel via Acid Catalysis," Ind. Eng. Chem. Res. 2005, 44, pp. 5353-5363.

Written Opinion issued in the related PCT Application No. PCT/US2008/63798, dated Aug. 19, 2008.

Written Opinion issued in the related PCT Application No. PCT/US2008/053359, dated May 23, 2008.

File History of the related U.S. Appl. No. 12/121,728, as of Nov. 9, 2009.

File History of the related U.S. Appl. No. 12/121,722, as of Nov. 9, 2009.

File History of the related U.S. Appl. No. 12/027,979, as of Nov. 9, 2009.

File History of the related U.S. Appl. No. 12/511,013, as of Nov. 9, 2009.

Handbook of Chemistry and Physics, 61st edition, pp. D155-D160, 1980 (month not an issue), CRC Press, Inc., Boca Raton, Florida.

F. Jeffrey Martin and William L. Kubic, Green Freedom (TM) A Concept for Producing Carbon-Neutral Synthetic Fuels and Chemicals (Patent Pending), Publication No. LA-UR-07-7897, Los Alamos National Laboratory, Nov. 2007, Los Alamos, NM.

Electrochemical Dictionary, Entry for Hydrogen Electrode, p. 342, Edited by Allen J. Bard, Gyorgy Inzelt and Fritz Scholz, Aug. 2008 (based on Amazon.com information), Springer-Verlag, Berlin, Germany.

Glass Electrodes for Hydrogen and Other Cations Principles and Practice, Chapter 2, Interpretation of pH and Cation Measurements, pp. 9-49, G. Mattock and D.M. Band, 1967 (month not an issue), Marcel Dekker, Inc., New York, NY.

The Encyclopedia of Electrochemistry, Entries for Hydrogen Electrode and Reference Electrodes, pp. 707, 1010-1015, Edited by Clifford A. Hampel, 1964 (month not an issue), Reinhold Publishing Corp., New York, NY.

* cited by examiner

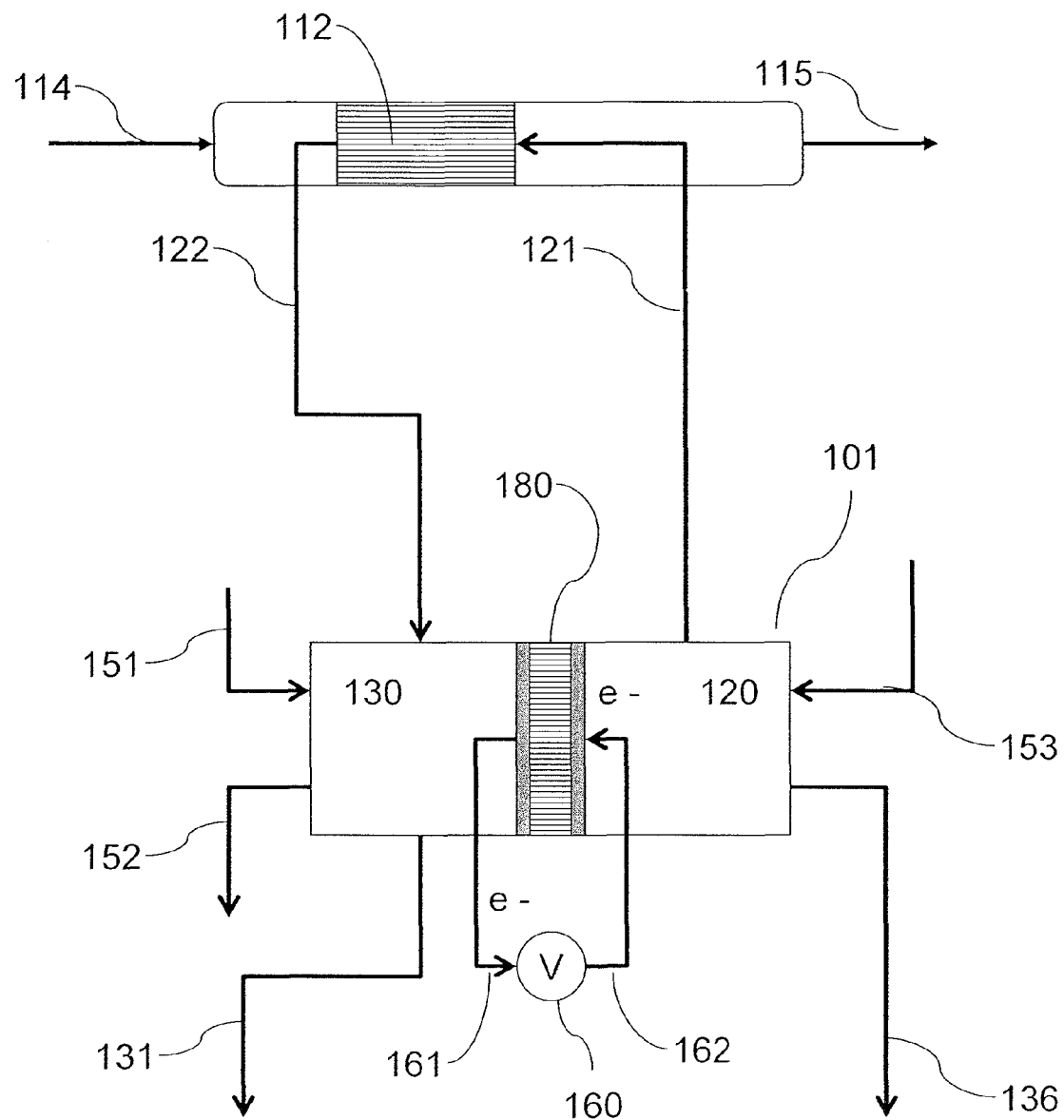
Fig 1     CO2 Absorber + Electrochemical Cell – H2 Based

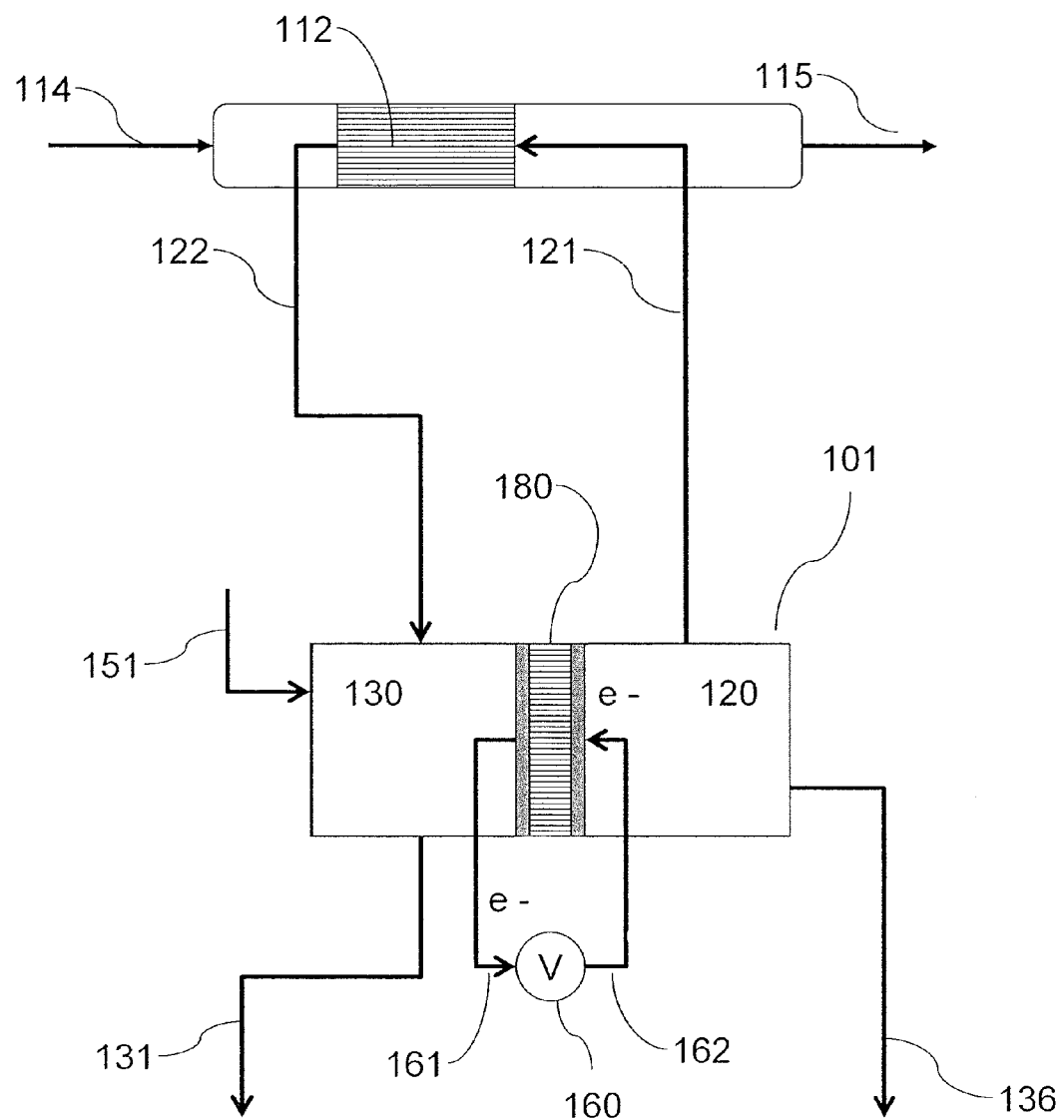
Fig 1 a  CO2 Absorber + Electrochemical Cell – H2 Based; Half Cell Separator Allows H2O Flow

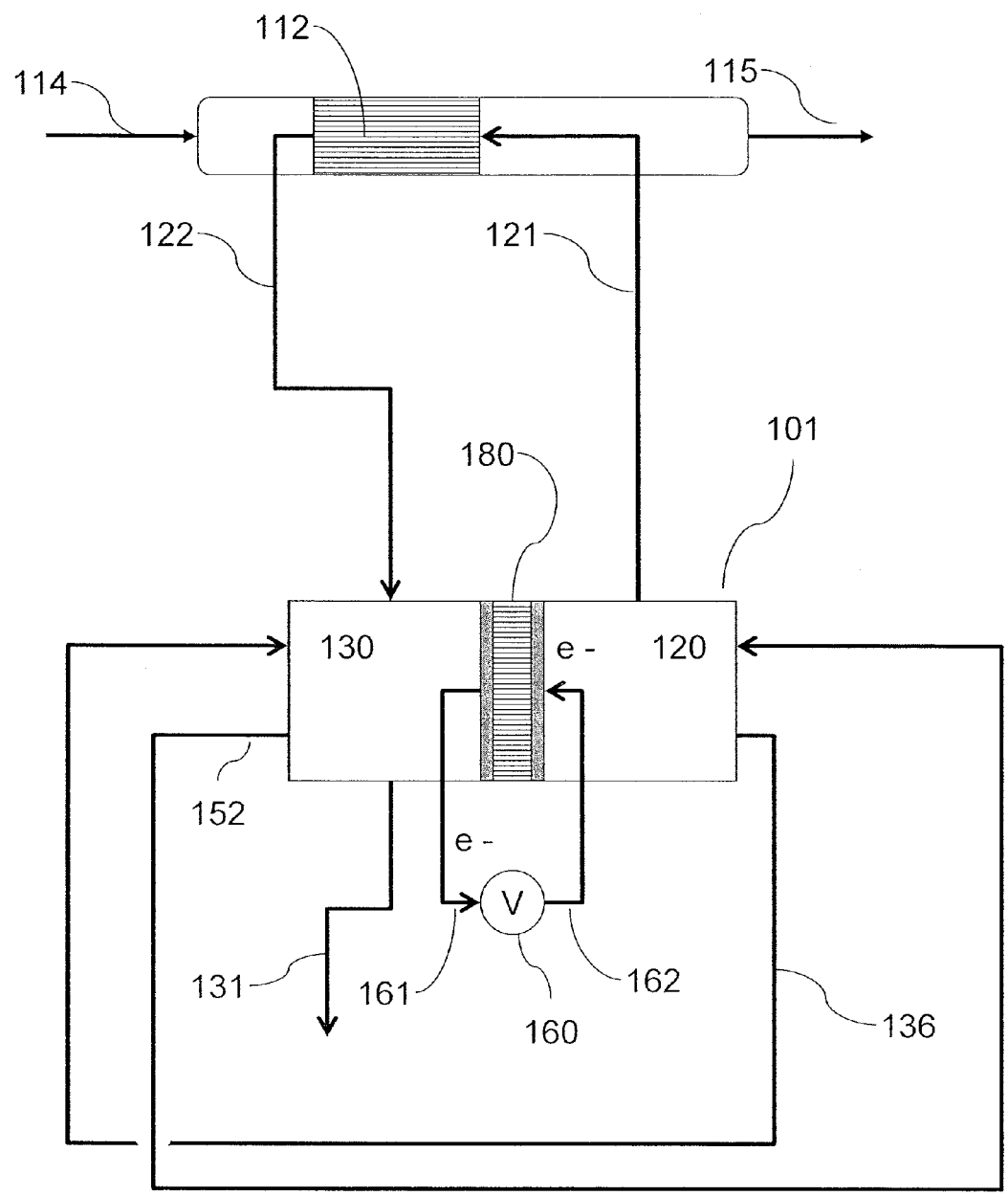
Fig 2   CO2 Absorber + Electrochemical Cell – H2 Based; Showing Optional Recycles

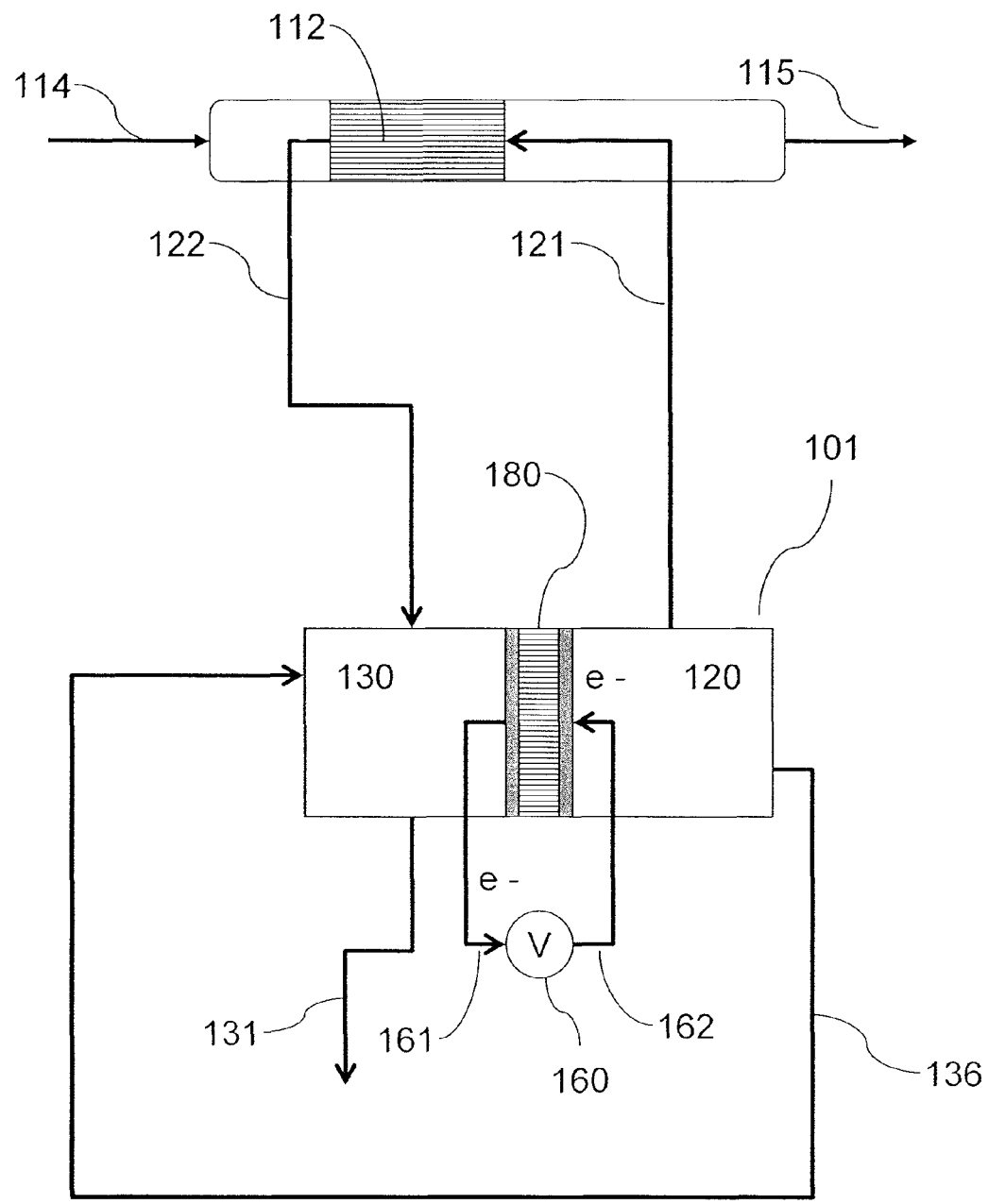
Fig 2 a  CO2 Absorber + Electrochemical Cell – H2 Based; Showing Optional Recycles; Half-cell Separator allows H2O Flow

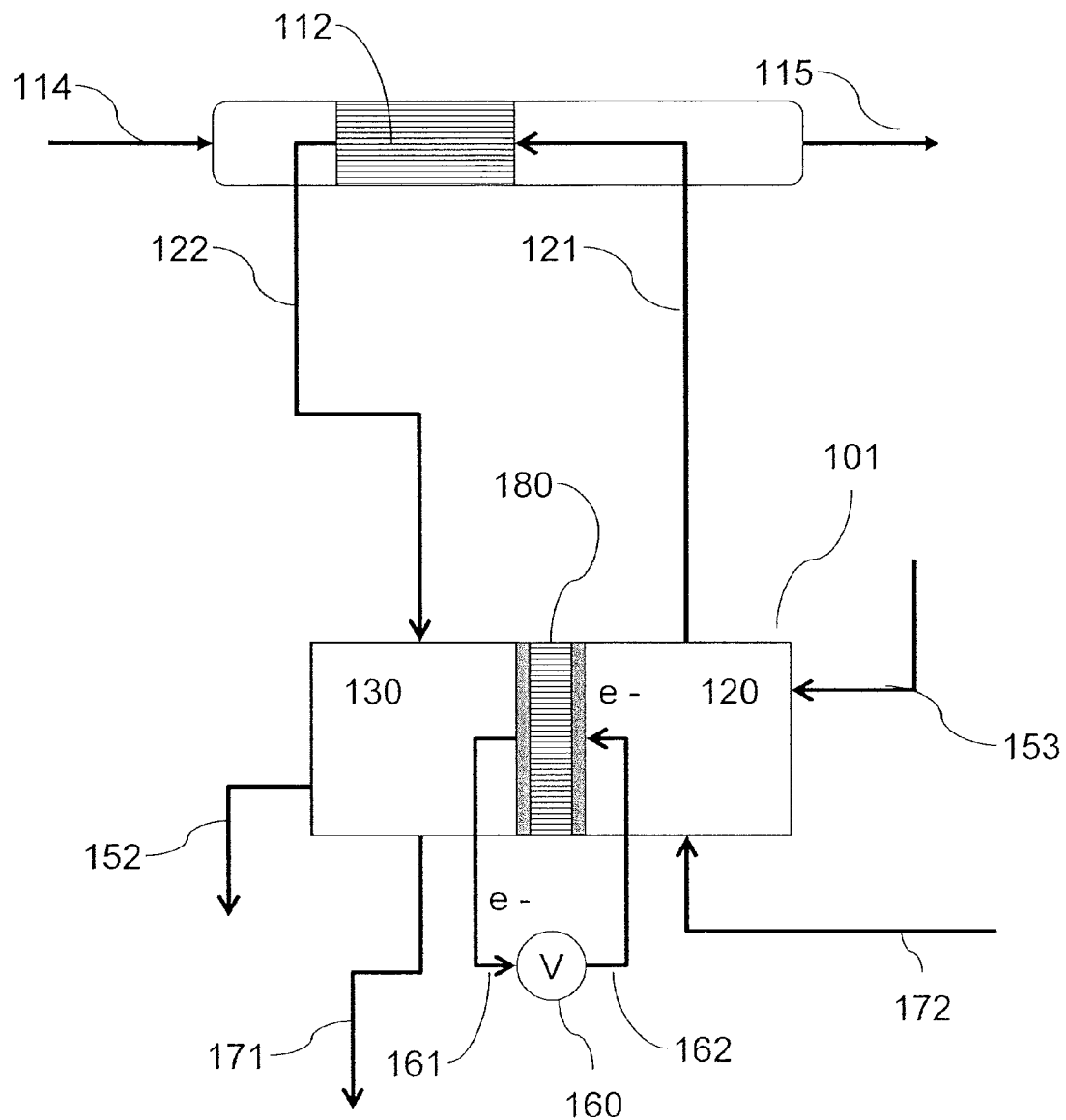
Fig 3   CO2 Absorber + Electrochemical Cell – O2 Based

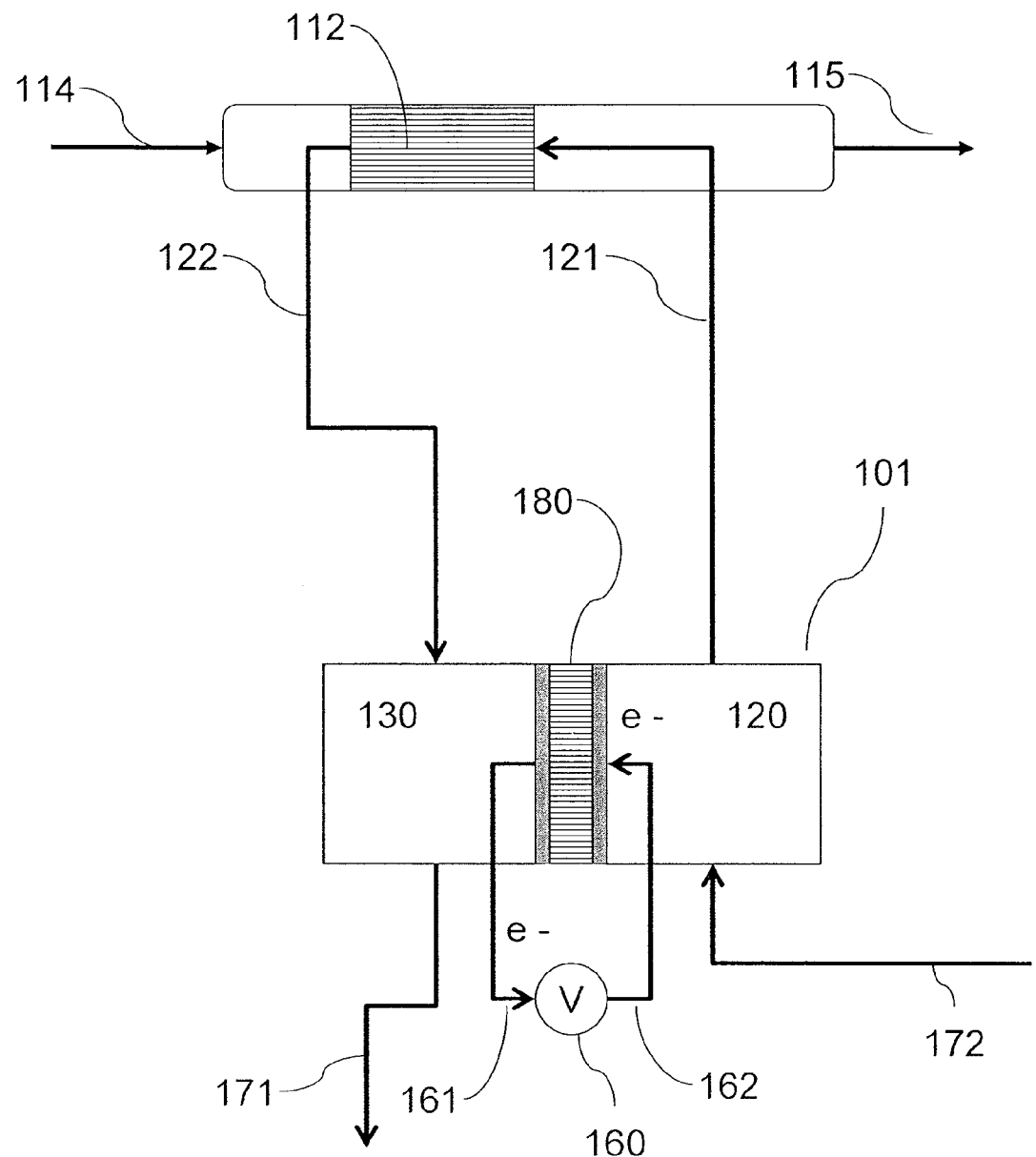
Fig 3 a  CO2 Absorber + Electrochemical Cell – O2 Based; Half-cell Separator allows H2O Flow

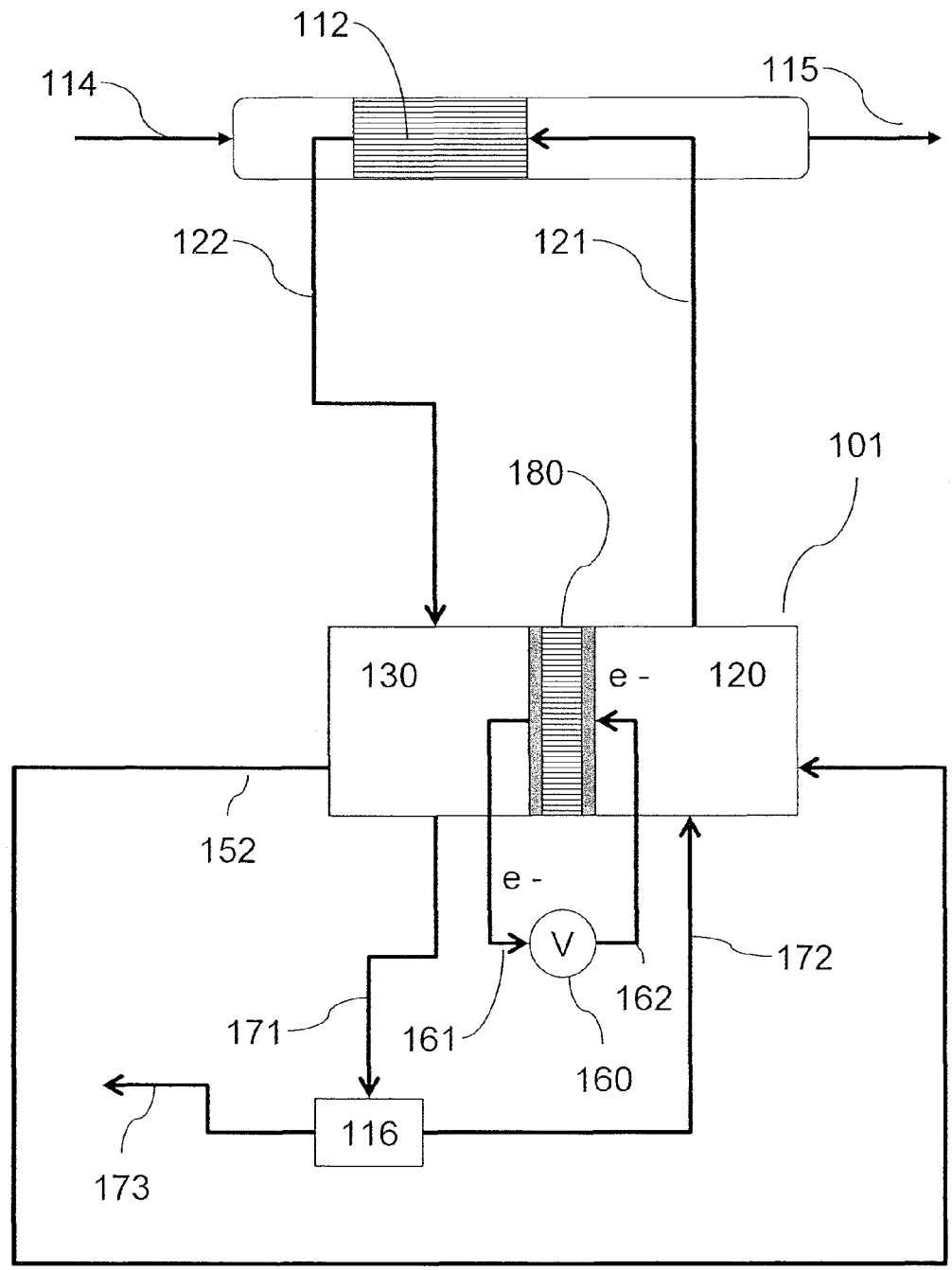
Fig 4  CO2 Absorber + Electrochemical Cell – O2 Based; Showing Optional Recycles

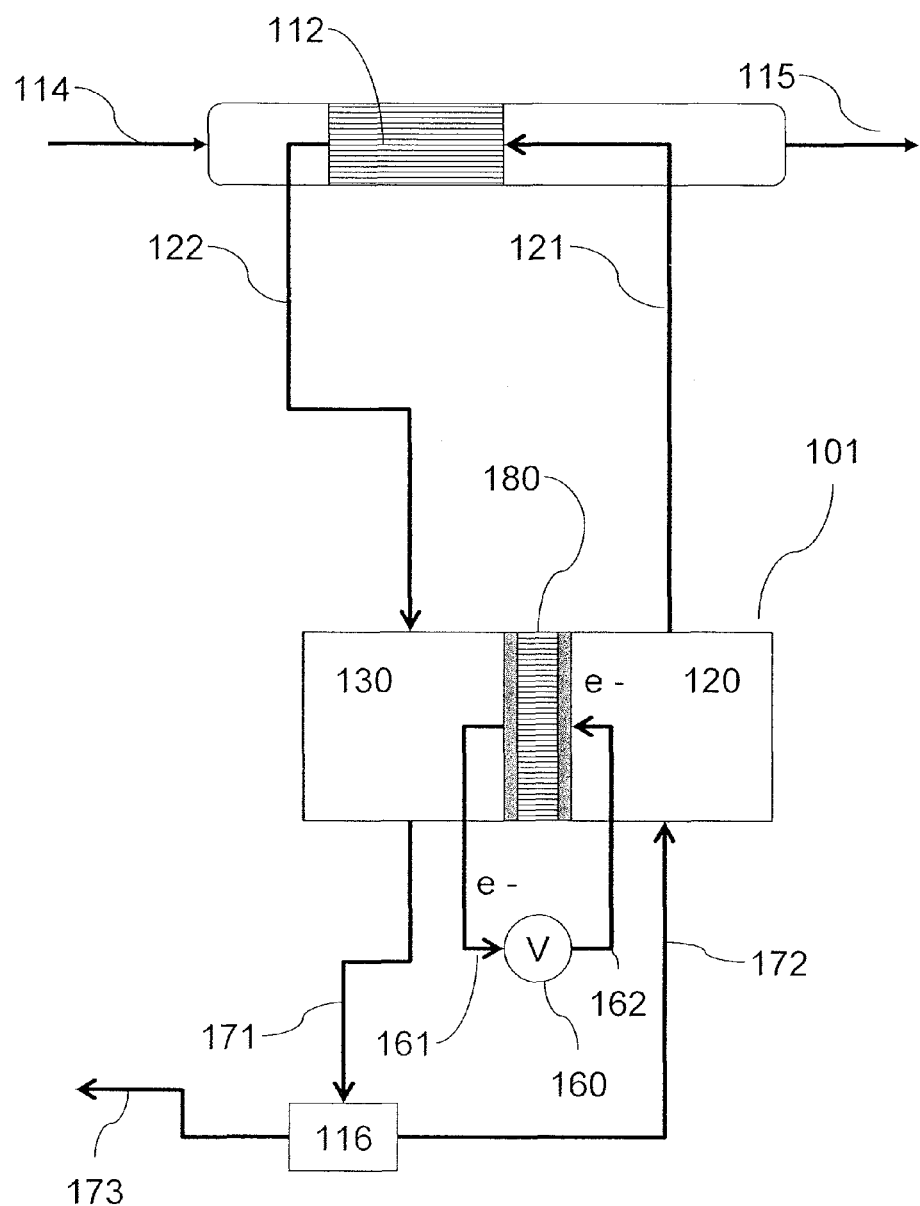
Fig 4 a   CO2 Absorber + Electrochemical Cell – O2 Based; Showing Optional Recycles; Half-cell Separator Allows H2O Flow

CARBON DIOXIDE ISOLATION AND GENERATION

CROSS-REFERENCE TO RELATED APPLICATIONS

This application claims the benefit under 35 U.S.C. §116(e) of U.S. provisional application Ser. No. 61/084,214, filed Jul. 28, 2008, the disclosure of which is hereby expressly incorporated by reference in its entirety and is hereby expressly made a portion of this application.

FIELD OF THE INVENTION

This invention relates to processes for sequestration of carbon from the atmosphere and the cultivation of biomass for the production of bio-fuels. In particular a process involving the step of absorbing ambient carbon dioxide from the atmosphere or exhaust stream, concentrating carbon dioxide while regenerating the absorption solution, and feeding the concentrated carbon dioxide to photo-bioreactors for the cultivation of biomass.

BACKGROUND OF THE INVENTION

The rising concern of global climate change due to increasing carbon dioxide levels in the atmosphere has increased the importance of biomass based fuel sources. Biomass materials can be converted into gaseous or solid fuels for combustion in boilers or into liquid fuels important in transportation markets. Materials typically considered for energy production include sugars, cellulose, and oils. Food based crops such as corn and sugar cane have been converted by fermentation into alcohols. Cellulose can be obtained from agriculture wastes, process wastes, grasses, wood chips, and dedicated energy crops. These materials can be dried, compressed and used as combustion feedstock for boilers or converted into sugars by chemical processes such as acid hydrolysis and fermented into alcohols. These alcohols can be blended with light distillate petroleum products such as gasoline, the primary automotive fuel in the US.

Triglycerides extracted from oil seed crops such as corn, soybeans, rapeseed, and palm can be processed into monoalkyl esters. These monoalkyl esters can be used as biodiesel or as blendstock for heavier distillate petroleum such as diesel fuel. The various biodiesel and biodiesel-petroleum blends can be used, depending on composition, as a diesel fuel replacement such as for heavy-duty transportation including trucks, trains and off road equipment, or for other fuel and chemical uses. Various sources of triglycerides that can be converted into monoalkyl esters include vegetable oils (including corn, soybean, palm, etc.), seed oils (cottonseed, palm kernel canola, rape, jatropha, neem, etc.) microbial oil (algal, fungal, bacterial, etc.), and animal fats (tallow, lard, etc.), as well as other animal and plant sources.

Oil seed crops can be converted into to biodiesel and can achieve approximately 80% recycling of the carbon dioxide on a field to wheels basis. One critical factor is the feedstock yield efficiency per acre. For example corn achieves 18 gallons of oil per acre, while soybeans achieve 48, rapeseed 127, jatropha 202, palm 635, and algae 10,000. Maximizing the feedstock yield efficiency decreases the acreage needed to meet production targets and helps to decrease the competition for land between food and energy. As a result algae can be a very attractive source for oil.

In addition, different types of land can be utilized for algae production than is typically used for agriculture. Because algae generally grow in a liquid medium, rather than the soil, algae production can occur on non-arable land, such as deserts.

Many of the algae discussed for algal oil production are photoautotrophic, meaning that they rely on $CO_2$ and sunlight for energy and food. Frequently, they are grown in photo-bioreactors. Concentrated sources of $CO_2$ are especially advantageous for production of this type of algae. Elevated concentrations of carbon dioxide frequently lead to higher productivity and higher yields of oil and lower concentrations of carbon dioxide when compared to ambient carbon dioxide, concentrations. These concentrated carbon dioxide sources can be found at such places as power plants, breweries, fermentation facilities, landfills, refineries, digesters, etc. Unfortunately, these concentrated carbon dioxide sources frequently are located in or near population centers, which have high land prices, and remote from locations with large expanses of unused land which could be used for algae production. Therefore, it is desirable to capture and/or concentrate the carbon dioxide available in the atmosphere or other source. In addition, the captured and/or concentrated carbon dioxide can be put to other desirable uses including carbon sequestration and as a chemical feedstock.

Methods for capturing or concentrating carbon dioxide have been described, such as the Green Freedom™ concept for producing carbon neutral synthetic fuels and chemicals (Los Alamos national laboratory, publication no. LA-UR-07-7897), which describes utilizing electricity from a nuclear power plant to power an electrochemical cell that simultaneously desorbs carbon dioxide from a scrubber solution and produces hydrogen and oxygen gas. Such a system would require too much electricity (approximately 410 kJ/mole of $CO_2$) and heat (approximately 100 kJ/mole $CO_2$) of low-level heat energy to be practical or broadly acceptable.

Another method for capturing or concentrating carbon dioxide was developed by NASA during the 1970s for removal of $CO_2$ from closed space craft atmospheres using high concentration carbonate liquids with low water content as their electrolytes. Such systems were expensive and complicated, due to the particular requirements for use in space travel.

SUMMARY OF THE INVENTION

A method for generating and utilizing carbon dioxide is desirable.

Accordingly, in a first aspect, a method is provided for generating $CO_2$, the method comprising exposing a gas comprising $CO_2$ to an aqueous material comprising more than about 20% water and having a pH of about 8.5 or above, whereby at least a portion of the $CO_2$ is dissolved in the aqueous material; subjecting the aqueous material comprising dissolved $CO_2$ to an electrical potential in an electrochemical cell, wherein the electrical potential is sufficient to convert hydroxide ions to water and to release at least a portion of the dissolved $CO_2$ as a gas, wherein the electrochemical cell has a first electrochemical half-cell, a second electrochemical half-cell, and a proton exchange membrane; and releasing at least a portion of the dissolved $CO_2$.

In an embodiment of the first aspect, a portion of the $CO_2$ dissolved in the aqueous material chemically reacts with carbonate or hydroxide ions to form bicarbonate and carbonate ions.

In an embodiment of the first aspect, at least a portion of the released $CO_2$ is collected from the electrochemical cell.

In an embodiment of the first aspect, at least a portion of the released $CO_2$ is collected from the electrochemical cell as a gas.

In an embodiment of the first aspect, the released $CO_2$ is present in a gas phase at a concentration of about 50% (vol.) $CO_2$.

In an embodiment of the first aspect, the released $CO_2$ is present in a gas phase at a concentration of about 70% (vol.) $CO_2$.

In an embodiment of the first aspect, the released $CO_2$ is present in a gas phase at a concentration of about 80% (vol.) $CO_2$.

In an embodiment of the first aspect, the released $CO_2$ is present in a gas phase at a concentration of about 90% (vol.) $CO_2$.

In an embodiment of the first aspect, the released $CO_2$ is present in a gas phase at a concentration of about 95% (vol.) $CO_2$.

In an embodiment of the first aspect, the proton exchange membrane separates an anode from a cathode.

In an embodiment of the first aspect, the aqueous material comprising dissolved $CO_2$ is exposed to an electrical potential sufficient to convert hydroxide ion to water in the first electrochemical half-cell.

In an embodiment of the first aspect, the aqueous material comprising dissolved $CO_2$ is exposed to an electrical potential sufficient to convert hydroxide ion to water in the first electrochemical half-cell reaction causing the local pH of the solution to decrease forcing the chemical equilibrium to release $CO_2$ form the aqueous material.

In an embodiment of the first aspect, the aqueous material comprising dissolved $CO_2$ is exposed to an electrical potential sufficient to convert hydroxide ion to water in the first electrochemical half-cell reaction causing the local pH of the solution to decrease forcing the chemical equilibrium to release $CO_2$ from the aqueous material.

In an embodiment of the first aspect, the aqueous material comprising dissolved $CO_2$ is exposed to an electrical potential sufficient to convert hydroxide ion to water in the first electrochemical half-cell, the first half cell utilizes hydrogen, and the second half cell generates hydrogen.

In an embodiment of the first aspect, the second half-cell utilizes oxygen, and the first half-cell generates oxygen.

In an embodiment of the first aspect, the first half-cell utilizes hydrogen and the second half-cell utilizes oxygen and the electrochemical cell generates power and $CO_2$. In an embodiment of the first aspect, the gas is obtained from at least one source selected from the group consisting of the atmosphere, a power plant, a boiler, a fermentation facility, an underground deposit, an oil well, a natural gas well, a petroleum refinery, a cement factory, an iron production facility, a steel production facility, a waste combustion facility, a chemical production facility, a metal production facility, and combinations thereof.

In an embodiment of the first aspect, half reactions take place in the first and second electrochemical cells, and the sum of the $E^0$ values for the half reactions is about 0.

In an embodiment of the first aspect, the aqueous material comprising dissolved $CO_2$ is exposed to an electrical potential sufficient to convert hydroxide ion to water in a first electrochemical half-cell in the presence of hydrogen, the second half cell generates hydrogen, the first half cell utilizes a first amount of hydrogen and the second half cell generates a second amount of hydrogen, and the first amount of hydrogen is within about 10% of the second amount of hydrogen.

In an embodiment of the first aspect, the second half cell utilizes a first amount of oxygen and a second half cell generates a second amount of oxygen, and the first amount of oxygen is within 10% of the second amount of oxygen.

In an embodiment of the first aspect, the electrochemical cell has an electrical energy requirement for releasing dissolved $CO_2$ as a gas, wherein the electrical energy requirement is less than about 350 KJ/mole $CO_2$.

In an embodiment of the first aspect, the electrochemical cell has an electrical energy requirement for releasing dissolved $CO_2$ as a gas, wherein the electrical energy requirement is less than about 200 KJ/mole $CO_2$.

In an embodiment of the first aspect, the electrochemical cell has an electrical energy requirement for releasing dissolved $CO_2$ as a gas, wherein the electrical energy requirement is less than about 100 KJ/mole $CO_2$.

In a second aspect, a method of utilizing $CO_2$ is provided, the method comprising exposing a gas comprising $CO_2$ to an aqueous material at pH of 8.5 or above to dissolve at least a portion of the $CO_2$; exposing the aqueous material comprising $CO_2$ to an electric potential sufficient to convert hydroxide ion to water in a first electrochemical half-cell; collecting the gas generated from the first electrochemical half-cell; using a second electrochemical half-cell to generate hydroxide ions; separating first and second electrochemical half-cell reactions with a proton exchange membrane; generating a gas comprising $CO_2$ from the electrochemical cell; and storing, sequestering, or utilizing as a chemical or biological feedstock at least a portion of the $CO_2$ generated.

In an embodiment of the second aspect, a portion of the $CO_2$ dissolved in the aqueous material chemically reacts with carbonate or hydroxide ions to form bicarbonate and carbonate ions.

In an embodiment of the second aspect, the method further comprising directing the gas generated from the first electrochemical half-cell to a bioreactor containing a microorganism, wherein the $CO_2$ is utilized by the microorganism.

In an embodiment of the second aspect, the method further comprising directing the gas generated from the first electrochemical half-cell to a bioreactor containing a microorganism, wherein the $CO_2$ is utilized by the microorganism, and the bioreactor is a photobioreactor.

In an embodiment of the second aspect, the method further comprising directing the gas generated from the first electrochemical half-cell to a bioreactor containing a microorganism, wherein the $CO_2$ is utilized by the microorganism the microorganism is an algae.

In an embodiment of the second aspect, the method further comprising directing the gas generated from the first electrochemical half-cell to a bioreactor containing a microorganism, wherein the $CO_2$ is utilized by the microorganism, and the microorganism is a phototrophic organism.

In an embodiment of the second aspect, the method further comprising directing the gas generated from the first electrochemical half-cell to a bioreactor containing a microorganism, wherein the $CO_2$ is utilized by the microorganism; growing the microorganism; and harvesting the microorganism.

In an embodiment of the second aspect, the method further comprising directing the gas generated from the first electrochemical half-cell to a bioreactor containing a microorganism, wherein the $CO_2$ is utilized by the microorganism; growing the microorganism; and harvesting a hydrocarbon compound produced by the microorganism.

In an embodiment of the second aspect, the method further comprising directing the gas generated from the first electrochemical half-cell to a bioreactor containing a microorganism, wherein the $CO_2$ is utilized by the microorganism; growing the microorganism; harvesting the microorganism; and processing the microorganism to generate an energy supply.

In an embodiment of the second aspect, the method further comprising directing the gas generated from the first electrochemical half-cell to a bioreactor containing a microorganism, wherein the $CO_2$ is utilized by the microorganism; growing the microorganism; harvesting the microorganism; and processing the microorganism to generate an energy supply, wherein the energy supply is a liquid.

In an embodiment of the second aspect, the method further comprising directing the gas generated from the first electrochemical half-cell to a bioreactor containing a microorganism, wherein the $CO_2$ is utilized by the microorganism; growing the microorganism; harvesting the microorganism; and processing the microorganism to generate an energy supply, wherein the energy supply is a biodiesel material.

In an embodiment of the second aspect, the method further comprising directing the gas generated from the first electrochemical half-cell to a bioreactor containing a microorganism, wherein the $CO_2$ is utilized by the microorganism; growing the microorganism; harvesting the microorganism; and processing the microorganism to generate an energy supply, wherein the energy supply is biomass.

In an embodiment of the second aspect, the method further comprising directing the gas generated from the first electrochemical half-cell to a bioreactor containing a microorganism, wherein the $CO_2$ is utilized by the microorganism; growing the microorganism; harvesting the microorganism; and depositing the harvested microorganism underground.

In an embodiment of the second aspect, the method further comprising directing the gas generated from the first electrochemical half-cell to a bioreactor containing a microorganism, wherein the $CO_2$ is utilized by the microorganism the microorganism is an algae, and the algae produces $H_2$.

In an embodiment of the second aspect, directing the gas generated from the first electrochemical half-cell to a storage facility, whereby the $CO_2$ is sequestered.

In a third aspect, a method of utilizing $CO_2$, is provided, the method comprising storing, sequestering, or utilizing as a chemical or biological feedstock $CO_2$, wherein at least a portion of the $CO_2$ is generated by exposing a gas comprising $CO_2$ to an aqueous material at pH of 8.5 or above to dissolve at least a portion of the $CO_2$, the aqueous material comprising $CO_2$ is exposed to an electric potential sufficient to convert hydroxide ion to water in a first electrochemical half-cell, wherein a gas comprising $CO_2$ is released from the first electrochemical half-cell, a second electrochemical half-cell is used to generate hydroxide ions, and the first and second electrochemical half-cell reactions are separated with a proton exchange membrane.

BRIEF DESCRIPTION OF THE DRAWINGS

Preferred embodiments will be described with reference to certain drawings. The drawings described are only schematic and are non-limiting. In the drawing, the size of some of the elements may be exaggerated and not drawn to scale for illustrative purposes. The dimensions and relative dimensions do not correspond to actual dimensions.

FIG. 1 is a diagram illustrating a $CO_2$ absorber and absorbent regeneration module based on an $H_2$ concentration electrochemical mechanism.

FIG. 1a is a diagram illustrating a $CO_2$ absorber and absorbent regeneration module based on an $H_2$ concentration electrochemical mechanism where a membrane supports internal flow of water.

FIG. 2 is a diagram illustrating a $CO_2$ absorber and absorbent regeneration module based on an $H_2$ concentration electrochemical mechanism showing optional recycles.

FIG. 2a is a diagram illustrating a $CO_2$ absorber and absorbent regeneration module based on an $H_2$ concentration electrochemical mechanism where a membrane supports internal flow of water and optional recycles of hydrogen.

FIG. 3 is a diagram illustrating a $CO_2$ absorber and absorbent regeneration module based on an $O_2$ concentration electrochemical mechanism.

FIG. 3a is a diagram illustrating a $CO_2$ absorber and absorbent regeneration module based on an $O_2$ concentration electrochemical mechanism where a membrane supports internal flow of water.

FIG. 4 is a diagram illustrating a $CO_2$ absorber and absorbent regeneration module based on an $O_2$ concentration electrochemical mechanism showing optional recycles.

FIG. 4a is a diagram illustrating a $CO_2$ absorber and absorbent regeneration module based on an $O_2$ concentration electrochemical mechanism where the membrane supports internal flow of water and showing optional recycle.

DETAILED DESCRIPTION OF THE PREFERRED EMBODIMENT

Figure 5:
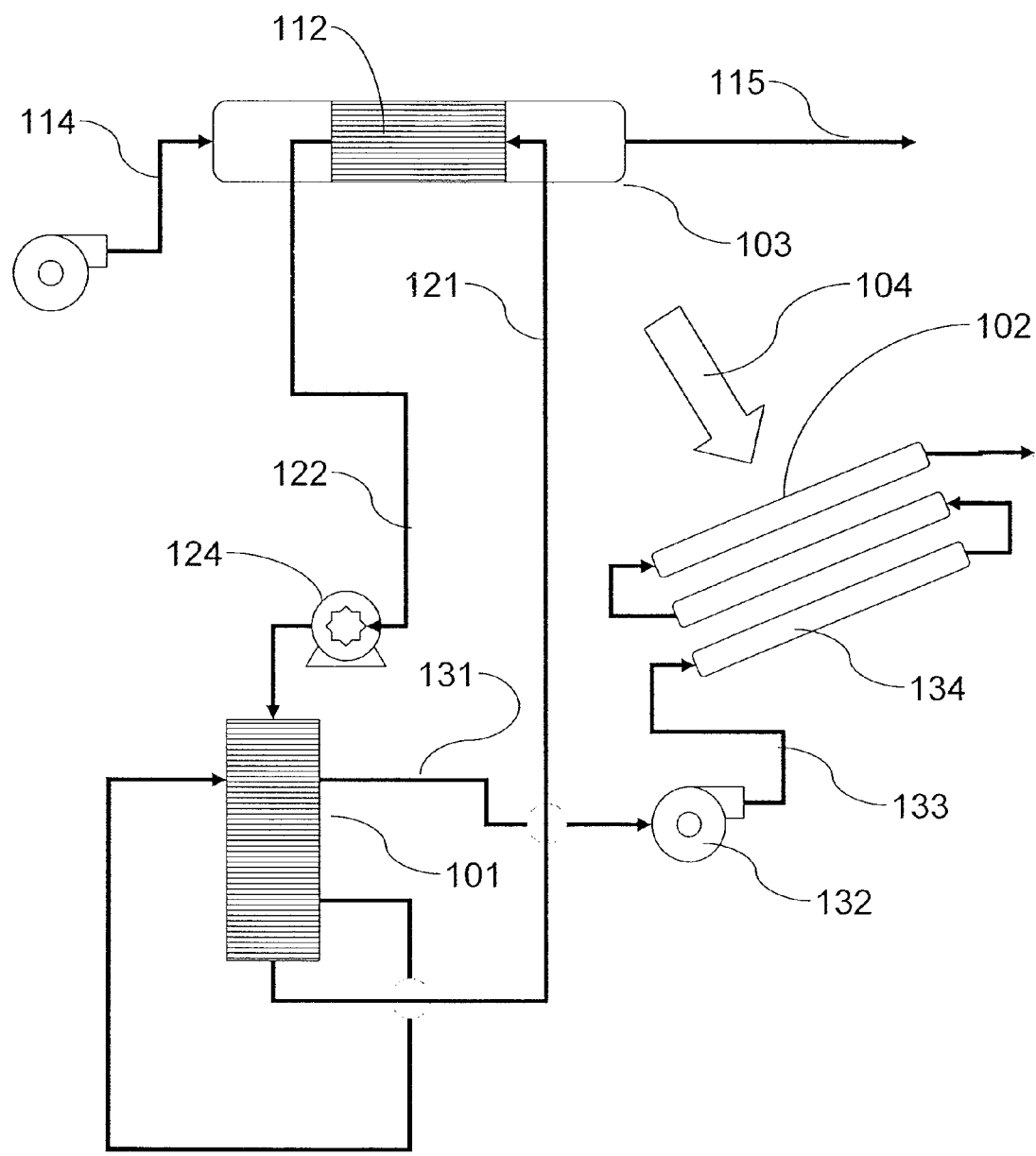
FIG. 5 is a diagram illustrating a $CO_2$ absorber and absorbent regeneration module with algae photobioreactor.

The following description and examples illustrate a preferred embodiment of the present invention in detail. Those of skill in the art will recognize that there are numerous variations and modifications of this invention that are encompassed by its scope. Accordingly, the description of a preferred embodiment should not be deemed to limit the scope of the present invention.

In accordance with one embodiment, carbon dioxide is extracted from a first gas stream and concentrated into a second gas stream, which is then, for example, used to feed algae being cultivated in a photo-bioreactor or cultivation pond, fed to a greenhouse such as to grow plants, used as a chemical reagent, or used in a carbon sequestering operation. In one embodiment, the first gas stream is ambient air, or ambient air with a slightly or moderately increased or decreased $CO_2$ concentration. Ambient air with slightly or moderately increased $CO_2$ concentrations might be found in the vicinity of a power plant or where fossil fuels are processed or used. In other embodiments, the gas stream might have a higher concentration of carbon dioxide, such as the exhaust gas from a power plant, a boiler, or some fossil fuel burning facility. In other embodiments, the gas stream can be from a fossil fuel production or processing facility, including gas generated from oil or gas wells, refineries, collecting facilities, purifying facilities, processing facilities, or utilizing facilities. In other embodiments, the gas stream can be from biomass processing facilities or biomass combustion facilities.

Absorption of $CO_2$ and Subsequent Release by Electrochemical Means with Hydrogen Present In one embodiment, a process for absorbing carbon dioxide ($CO_2$) from a gas stream and then subsequently releasing the carbon dioxide from the absorption fluid by means of electrochemical reaction is provided. The carbon dioxide can be absorbed from the ambient air, the exhaust of a power plant, a boiler, a fermentation facility, an underground deposit, an oil well, a natural gas well, a petroleum refinery, a cement factory, an iron production facility, a steel production facility, a waste combustion facility, a chemical production facility, a metal production facility, or a combination of these processes or other processes that generate $CO_2$ from the combustion of fossil or biomass fuels, or produce $CO_2$ from some other source. The carbon dioxide can be absorbed into a liquid stream. The absorbed $CO_2$ can chemically react with carbonate or hydroxide ions to form bicarbonate or carbonate ions. This liquid stream can then be regenerated to release the $CO_2$ in a concentrated form that can be used for other applications, such as for storage, sequestration, as a chemical or biological feedstock, or other purposes as well. In some embodiments, sequestration can occur with placement of at least a portion of the $CO_2$ underground or underwater, on the ground, in tanks, or elsewhere so as to temporarily or permanently prevent the $CO_2$ from interacting with the carbon cycle, and includes use of $CO_2$ in gaseous, liquid, and solid forms as well as converted forms, such after conversion to biomass or biologically or chemically related material. In some embodiments, utilization of the $CO_2$ as a chemical feedstock can include using it for any purpose the chemical or physical properties of $CO_2$ are desirable, such as its reactivity or nonreactivity, and can include use in reaction systems, use to create a less or nonreactive environment, refrigeration, carbonation, pressurization, etc. In some embodiments, utilization of the $CO_2$ as a biological feedstock can include using it in relation to causing or facilitating growth, or retarding or inhibiting growth, or causing or facilitating changes in molecular pathways such as to increase production of biomass or a metabolite, decrease production of biomass or a metabolite, or change the production of one metabolite or type of biomass in relation to another, whether plant, animal, or microbe related. Some embodiments can include use in a storage system, an underground storage facility, sequestration systems of $CO_2$, fed to a bioreactor containing algae, fed to a greenhouse or agricultural zone, industrial concentration or liquefaction system, or other potential use of $CO_2$.

FIG. 1 depicts schematically a process where the carbon dioxide bearing stream 114 passes through absorber 112 where it is scrubbed with basic scrubbing solution 121 to remove at least a portion of the carbon dioxide, resulting in a scrubbed gas 115 and the carbon dioxide enriched solution 122. The carbon dioxide enriched solution 122 is directed to electrochemical cell 101 where it enters the anode half cell 130. Hydrogen gas 151 and enters the cell and a voltage 160 is applied between the anode half cell 130 and the cathode half cell 120, forcing electrons to flow from the anode 161 to the cathode 162, resulting in the conversion of hydroxide ion and hydrogen gas to water along with the generation of carbon dioxide gas from carbonate ions, bicarbonate ion, and carbonic acid that are present such as by the following half reaction and reactions:

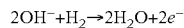

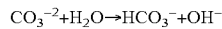

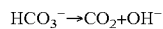

The carbon dioxide 131 is removed from the half cell; an ionic membrane 180 allows passage of positively charged ions present from the anode half cell 130 to the cathode half cell 120 while limiting the passage of water and negatively charged ions that are present. Water 152, which may contain various ions and species that are present in the anode half cell is removed from the anode half cell 130.

In the cathode half cell 120, water 153, purified or containing other substances, enters the cathode half cell 120 where the following half reactions can occur with addition of electrons at the cathode 162:

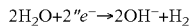

Hydrogen 136 is removed from the half cell, and refreshed basic scrubbing aqueous material or solution is directed from the cathode half cell 120 to the absorber 112. The membrane separating the anode half cell reaction and the cathode half cell reaction can be a proton exchange membrane. The protons entering the anode side flow through the proton exchange membrane to the cathode completing the electrochemical circuit and providing protons at the cathode to match the hydroxide ions generated in the cathode reaction.

FIG. 1a is similar to FIG. 1, except that the half cell divider 181 is less resistant to the flow of water between the anode half cell 130 and a cathode half cell 120. This allows the reduction or complete elimination of an external water supply to the cathode half cell 120, such as with water feed 153 in FIG. 1. In some embodiments, only a portion of the water requirements of the cathode half cell 120 passes through the cell divider 181 with the balance supplied to the cathode half cell 120 from an external source, and the excess in the anode half cell 130 removed.

FIG. 2 is similar to FIG. 1, but shows the optional steps of externally recycling of water 152 from the anode half cell 130 to the cathode half cell 120, and recycling of hydrogen 136 from the cathode half cell 120 to the anode half cell 130. This figure shows both of these recycles occurring, however it is also contemplated that only the hydrogen or only the water would be recycled. In addition, in some embodiments only a portion of the water or only a portion of the hydrogen is recycled with the balance of the systems requirements made up from other sources. In some embodiments, additional hydrogen can be added to the anode half cell 130 as well. In some embodiments, the hydrogen recycle is done externally, such as through piping or ducting. In other embodiments, the hydrogen is routed from one half cell to the other internally to the construction of the electrochemical cell 101 without external routing. In other embodiments, the hydrogen is directed from one half cell to the other with a combination of internal and external routing.

FIG. 2a is similar to FIG. 2 except that the half cell divider 181, as with FIG. 1a, is less resistant to water flow between the half cells and allows at least a portion of the water requirements of the cathode half cell 120 pass through the half cell divider 181. If additional water is required in the cathode half cell 120, this water can be provided with an external source, such as is shown with water feed 153 in FIG. 1, or with an external recycle of water 152 as shown in FIG. 2. FIG. 2a also shows the optional recycle of hydrogen 136 from the cathode half cell 120 to the anode half cell 130. All of the hydrogen generated, or only a portion can be recycled. Similarly, the entire hydrogen requirement of the anode half cell 130 can be supplied from the hydrogen generated, or only a portion.

Absorption of $CO_2$ and Subsequent Release by Electrical Means With Oxygen Present FIG. 3 depicts schematically an embodiment where the electrochemical cell 101 can be operated to produce and consume oxygen instead of hydrogen. The absorber 112 operation is similar to that as described for FIG. 1 with the carbon dioxide bearing gas 114 entering and the scrubbed gas 115 exiting absorber 112 with at least a portion of the carbon dioxide being transferred to the basic scrubbing solution 121 resulting in the carbon dioxide enriched solution 122. The carbon dioxide enriched solution is directed to the anode half cell 130 of electrochemical cell 101. An electrical potential 160 is applied between the anode half cell 130 and the cathode half cell 120 resulting in the conversion of hydroxide ion to oxygen and water along with the generation of carbon dioxide gas from carbonate ions, bicarbonate ion, and carbonic acid that are present such as by the following half reaction and reactions:

$$4OH^- \rightarrow O_2 + 2H_2O + 4e^-$$

$$CO_3^{-2} + H_2O \rightarrow HCO_3^- + OH^-$$

$$HCO_3^- \rightarrow CO_2 + OH^-$$

The carbon dioxide and oxygen 171 is removed from the half cell; an ionic membrane 180 allows passage of positively charged ions present from the anode half cell 130 to the cathode half cell 120 while limiting the passage of water and negatively charged ions that are present. Water 152, which may contain various ions and species that are present in the anode half cell 130 is removed from the anode half cell 130.

In the cathode half cell 120, water 153, purified or containing other substances, enters the cathode half cell 120 with oxygen 172 where the following half reactions can occur with addition of electrons at the cathode 162:

$$O_2 + 2H_2O + 4e^- \rightarrow 4OH^-$$

Refreshed basic scrubbing solution is directed from the cathode half cell 120 to the absorber 112. Excess oxygen can also be vented from the cathode half cell 120.

FIG. 3a is similar to FIG. 3 except that the half cell divider 181, as with FIG. 1a, is less resistant to water flow between the half cells and allows at least a portion of the water requirements of the cathode half cell 120 to pass through the half cell divider 181. If additional water is desired in the cathode half cell 120, this water can be provided with an external source, such as is shown with water feed 153 in FIG. 3.

FIG. 4 is similar to FIG. 3, but shows the optional steps of recycling of water 152 from the anode half cell 130 to the cathode half cell 120, and recycling of oxygen 172 from the anode half cell 120 after treatment with a separator 116 to provide an oxygen enriched stream 172 to the cathode half cell 130. Separator 116 also provides a carbon dioxide enriched stream 173. This figure shows both of these recycles occurring, however it is also contemplated that only the oxygen or only the water would be recycled. In addition, in some embodiments only a portion of the water or only a portion of the oxygen is recycled with the balance of the systems requirements made up from other sources. In some embodiments, additional oxygen can be added to the cathode half cell 120 as well. In some embodiments, the oxygen recycle is done externally, such as through piping or ducting. In other embodiments, the oxygen is routed from one half cell to the other internally to the construction of the electrochemical cell 101 without external routing. In other embodiments, the oxygen is directed from one half cell to the other with a combination of internal and external routing.

FIG. 4a is similar to FIG. 4 except that the half cell divider 181, as with FIG. 3a, is less resistant to water flow between the half cells and allows at least a portion of the water requirements of the cathode half cell 120 to pass through the half cell divider 181. If additional water is desired in the cathode half cell 120, this water can be provided, for example, with an external source, such as is shown with water feed 153 in FIG. 1, or with an external recycle of water 152 as shown in FIG. 4. FIG. 4a also shows the optional recycle of oxygen 172 from the anode half cell 130 to the cathode half cell 120. All of the oxygen generated, or only a portion can be recycled. Similarly, the entire oxygen requirement of the cathode half cell 120 can be supplied from the oxygen generated, or only a portion.

Optional Water Control Feature

In some embodiments, it can be desirable to control or limit the amount of water in the gas outlet stream such as carbon dioxide outlet 131, hydrogen outlet 136, or carbon dioxide/oxygen outlet 170. Limiting the amount of water in these gas streams can be useful in, for example situations, where the amount of water available is limited such as in the desert. Various techniques can be used to limit the water losses in these gas streams such as operating the electrochemical half cells at pressure to decrease the relative water vapor pressure in equilibrium with the ionic solutions. In addition desiccation and adsorption techniques can be integrated to provide additional water management. One example of such techniques includes utilizing an adsorption wheel. When dealing with ionic solutions 121 and 122, the solubility of hydroxide, carbonate and bicarbonate salts can be managed to prevent precipitation in active half cell regions. Temperature and pressure can be used to enhance solubility.

Integration of Absorber and Electrochemical Cell with Algae Production

FIG. 5 depicts schematically an embodiment where the carbon dioxide absorber and electrochemical cell are combined with a photo bioreactor as can be used for algae production.

Carbon dioxide bearing gas flows through a $CO_2$ absorption module 103. A basic scrubbing solution 121 contacts with the gas in absorption module 103 and absorbs $CO_2$ form the gas stream. The $CO_2$ enriched solution flows to electrochemical cell 101, in which $CO_2$ is transferred to a concentrated gas stream 131 and the basic scrubbing solution is regenerated and returned to the absorption module 103. The $CO_2$ stream is directed to a photo-bioreactor 102 where algae grow in the presence of light 104. The algae can then be harvested and used.

In one embodiment the algae species is selected for its high production of lipids or oils that are extracted for production of biodiesel or liquid fuel substitutes. In another embodiment the algae is used as a feedstock for other products such as cosmetics, pharmaceuticals, antioxidants and omega-3 polyunsaturated fatty acids. In another embodiment, the algae is used as a fuel. In other embodiments the algae is dried and stored to sequester the carbon. In other embodiments the algae is used for a combination of these uses, for example, lipids can be extracted and the remaining biomass can be stored to sequester carbon. Many species of microalgae are known for their high production of lipids, fatty acids and other useful compounds such as the rhodophyte *Porphyridium cruentum*, the eustigmatophytes *Monodus subterraneus, Nannochloropsis* spp, *Scenedesmus, Tetraselmis, Isochrysis, Dunaliella, Haematococcus, Chlorella, Parietochloris, Phaeodactylum tricornutum, Nitzschia* spp, the dinoflagellate *Crypthecodinium cohnii*, Nitzschia, thraustochytrids, Schizotrichium, Thraustrochytrium, rhodophyte Porphyridium, Botryococcus, *Botryococcus braunii*, coccolithophorid *Emilianea huxleyi* and others. Microorganisms, including microalgae, can be classified according to energy source and carbon source. For example, heterotrophs are commonly described as obtaining carbon and energy from organic molecules; photoheterotrophs obtaining energy from light and carbon from organic molecules; chemoheterotrophs obtaining energy from the oxidation of inorganic molecules, and carbon from organic molecules; photoautotrophs obtaining carbon from carbon dioxide and energy from light; chemoautotrophs obtaining carbon from carbon dioxide and energy from oxidation of inorganic molecules. Any of the microorganisms which utilize carbon dioxide, such as photoautotrophs and chemoautotrophs, whether named above or not, can be used in conjunction with the methods described herein.

Integration of Algae System with Water Control Techniques

In some embodiments, it can be desirable to control or limit the amount of water in the gas outlet stream, such as to reduce or limit water losses to the environment. Such losses can be important when operating a system in, for example, the desert. As discussed previously, desiccation and/or adsorption techniques can be used at various points in the process to limit water losses. When the $CO_2$ capture system is used in conjunction with a bioreactor or photobioreactor, a water capture device can be used in FIG. 5 on stream 131, 133, or a gas outlet from the bioreactor or photobioreactor.

Description of Absorption Module

Figure 6:
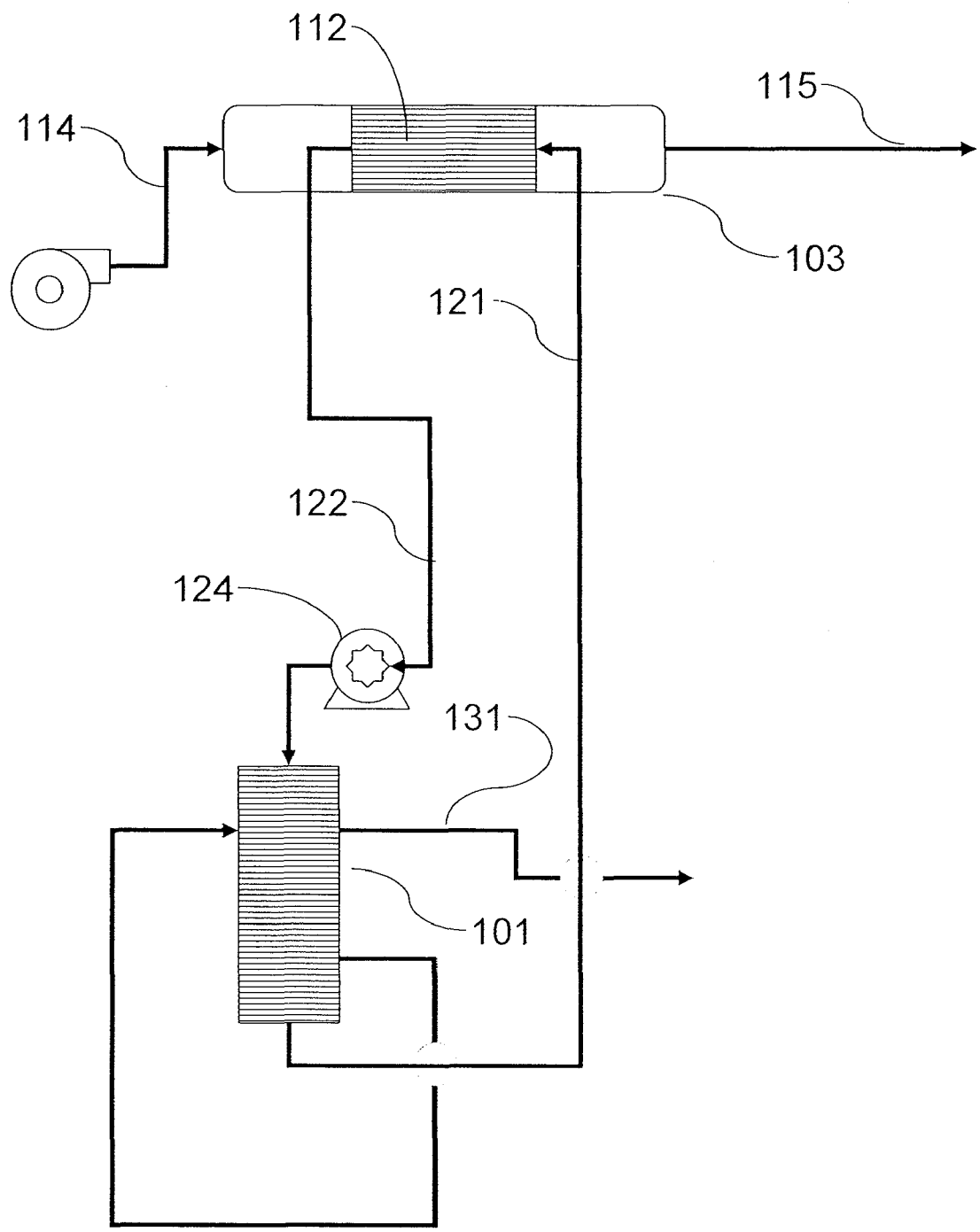
FIG. 6 is a diagram illustrating a $CO_2$ absorber and absorbent regeneration module with algae photobioreactor.

In one embodiment, the absorption module 103 as shown in FIG. 6 can be any suitable liquid-gas contacting device, operating directly or indirectly. Examples include all forms of spray systems, packed towers (with structured packing or random/dumped packing), plate columns, porous/permeable/semipermeable tube arrangements, etc. Indirect systems, such as porous/permeable/semipermeable tube arrangements will frequently have the scrubbing fluid inside the tubes and the gas to be scrubbed outside, with the species being removed from the gas stream passing through the wall of the tube. However, other arrangements can have the gas on the inside of the tubes and the scrubbing fluid outside of the tubes. Other geometric shapes, such as plates, flattened tubes, chambers, or barriers can be used instead of tubes. The material used for the tubes, or other-shape numbers, can be porous, made from membranes, or made from other suitable material.

In one embodiment the module 103 consists of a bundle of porous membranes 112 with $CO_2$-laden gas stream 114 on one side and a concentrated hydroxide solution on the other. $CO_2$ from the air stream passes through the membrane pores and is absorbed into the hydroxide solution reacting with the hydroxide ions to form a carbonate ion and water, and leaving a $CO_2$-depleted gas stream 115. As more $CO_2$ is absorbed the carbonate ions are converted into bicarbonate ions. The molar heat of absorption of $CO_2$ is independent of the hydroxide concentration of the solutions and the amount of $CO_2$ absorbed and is $\Delta abs\ H\ m = -44\ (\pm 2)\ kJ\ mol^{-1}\ CO_2$. These absorption reactions are as follows:

| | |
|---|---|
| $CO_2 + 2OH^- \rightarrow CO_3 + H_2O$ | $\Delta H = -44$ kJ/mol $CO_2$ |
| $CO_2 + CO_3^{2-} + H_2O \rightarrow 2HCO_3^-$ | $\Delta H = -44$ kJ/mol $CO_2$ |

In one embodiment, the solution's cations can be potassium, sodium, rubidium, cesium or a eutectic mixture of these cations. The mixture is determined to control the solubility of the solution as the anions transition from hydroxide ions to carbonate and bicarbonate. In some embodiments the mixture is tailored to support the isolation of bicarbonate salts through precipitation. In situations where a concentrated source of $CO_2$ is isolated from the application or use of the $CO_2$, it can be advantageous to transport the $CO_2$, and a bicarbonate salt precipitate can provide a viable medium for transporting $CO_2$ and precipitated hydroxide salt as can serve as a medium for transporting the regenerated absorbent solution.

In some embodiments of the process, the management of water in the absorption module 112 can be undertaken. In such cases, desiccation and adsorption techniques can be integrated between the inlet stream 114 and the outlet stream 115. One example of such techniques includes utilizing an adsorption wheel between the streams recycling water from the outlet stream 115 back into the inlet stream 114.

In some embodiments, the hydroxide solution flows into the module 103 through a connection 121 and passes on one side of the membranes 112. $CO_2$ is absorbed and the solution leaves the module 103 through a connection 122 and into pump 124 and into the electrochemical hydroxide solution generator 101. In the electrochemical hydroxide generator 101 the $CO_2$ latent solution is regenerated into a hydroxide solution that is passed back to the module 103 and a carbon dioxide stream 131.

Figure 7:
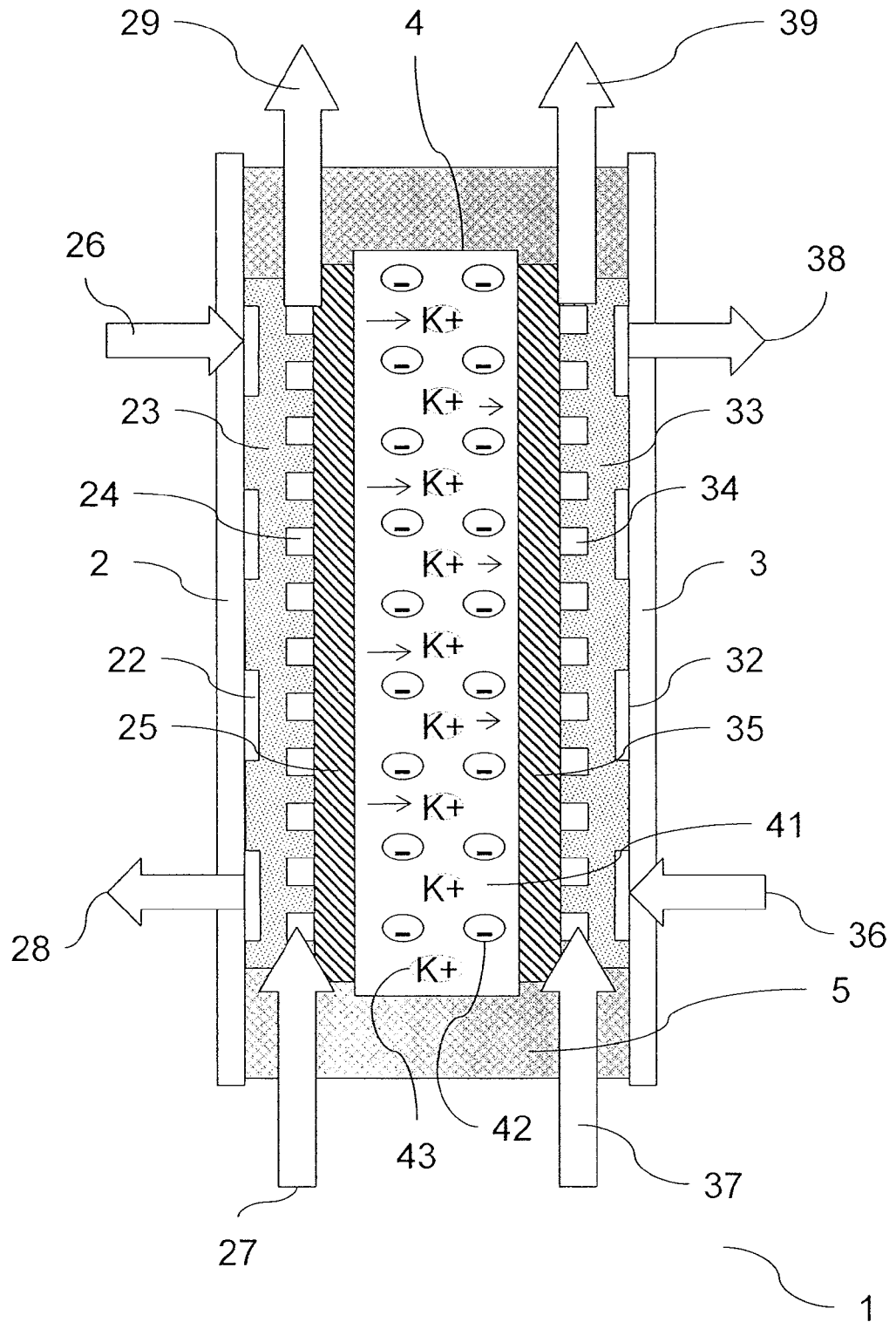
FIG. 7 is a diagram illustrating one embodiment of a single cell of a regeneration module.

Details of an Exemplary Electrochemical Cell Operating in the Hydrogen-based System The operation of the generator 101 is explained by examining FIG. 7. The hydroxide solution generator 101 consists of a series of electrochemical cells stacked together. A single cell 1 is shown in FIG. 7 and consists of an electrochemical cell 4 consisting of an ion exchange membrane 41, an anode 25 and cathode 35. The ion exchange membrane 41 has anions 42 attached to the polymer backbone of the membrane, supporting the transport of free cations 43. Various materials can be used for the membrane, such as sulfonated tetrafluoroethylene copolymer, hydrocarbon membrane (such as polymers or copolymers of one or more of styrene, chloromethylstyrene, and divinylbenzene) with ionic functional groups (such as sulfonic acid groups), etc. Brand names for these materials include Dupont Nafion®, Membranes International CMI-7000 series cation exchange membranes, Asahi Glass Flemion and Selemion membranes, etc. Additional materials can also be used that are proton or cation conducting membranes. The cell 4 is sandwiched between an anode side porous feed plate 23 and a cathode side porous feed plate 33. This cell assembly separated from another cell assembly by an anode side bipolar plate 2 and from another cell assembly by a cathode side bipolar plate 3. The $CO_2$ saturated solution from connection 122 flows into the single cell 1 byway of port 26 and into the backside of the anode side porous feed plate 23 byway of distribution channels 22. These distribution channels can be formed into the porous feed plate 23 as illustrated or into the bipolar plate 2 and 3. Flowing through liquid filled pore of the plate 23 the solution flows into anode 25. Hydrogen 27 is fed to the anode 25 through flow cavities 24, and $CO_2$ (or a combination of $CO_2$ and hydrogen) exits the cell at connection 29.

In this embodiment, hydrogen gas is used as the electrochemically active gas. Hydrogen gas can frequently result in lower over-potentials, and thereby, decrease the energy required to regenerate the hydroxide solution and release the $CO_2$ gas. In another embodiment, oxygen gas can be used as the active gas on the cathode side of the electrochemical cell. Additional configurations of the electrochemical cell are possible, and the description of any one embodiment, should not be construed as limiting the scope of the disclosure.

The hydrogen working gas is feed into the cell byway of port 27 and distributed uniformly across the anode byway of gas flow channels 24. The anode reaction consists of a series of chemical and electrochemical reactions. Hydrogen gas is consumed in an electrochemical half-cell reaction effectively consuming hydroxide ions and releasing free electrons and forming water. This process causes the equilibrium between bicarbonate, carbonate and hydroxide ions to shift releasing gaseous $CO_2$.

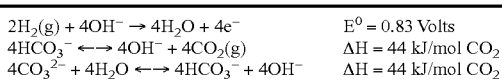

| | |
|---|---|
| $2H_2(g) + 4OH^- \rightarrow 4H_2O + 4e^-$ | $E^0 = 0.83$ Volts |
| $4HCO_3^- \leftrightarrow 4OH^- + 4CO_2(g)$ | $\Delta H = 44$ kJ/mol $CO_2$ |
| $4CO_3^{2-} + 4H_2O \leftrightarrow 4HCO_3^- + 4OH^-$ | $\Delta H = 44$ kJ/mol $CO_2$ |

The effect is to consume the anions from the $CO_2$ saturated solution flowing through the anode side porous feed plate 23 and liberating the absorbed $CO_2$ as a gas. The amount of solution flowing into the module 101 and the cumulative current flow (number of cells multiplied by the amps per cell or cell-amps) are balanced to mange proper operation of the process. The free electrons ($e^-$) flow to the cathode through the external circuit or through the bipolar plates to the next cell in the stack. The cations 43 in the solution enter the ion exchange membrane and carry the current from the anode to the cathode electrode. These cations are hydrated with bound water molecules that flow along with the cations to the cathode. The liberated $CO_2$ enters the hydrogen gas stream and exits the anode side of the cell byway of exit port 29.

At the cathode the water is combined with the electrons to form hydrogen gas and hydroxide ions. The hydroxide ions combine with the cations flowing through the ion exchange membrane to regenerate the hydroxide solution and gaseous hydrogen. The electrochemical half cell reaction is as follows and is the reverse of the anode side half cell reaction.

| | |
|---|---|
| $4H_2O + 4e^- \rightarrow 2H_2(g) + 4OH^-$ | $E^0 = -0.83$ |

The gaseous hydrogen produced by the half cell reaction flows into the cathode side gas channels 34 and exits through port 39. The hydroxide solution flows into the cathode side porous feed plate 33 and into the distribution channels 32 and exits the cell byway of port 38. The concentration of the hydroxide solution is controlled by the hydration of the cations migrating through the membrane. If additional water is required to maintain solubility it can be added byway of cathode side feed port 36, or solubility can be improved by increasing cell operating temperatures. Exit port 38 is connected to connection 121 to support the return of the solution to the $CO_2$ absorption module 103. The hydrogen generated at the cathode flows through connection 136 and into the anode side of the cell through port 27. The amount of hydrogen consumed at the anode is equivalent to the amount of hydrogen generated at the cathode, and therefore, there is no net consumption of hydrogen except through leaks or other losses within the system. This combination of half cell reactions or electrochemical mechanism is defined as the hydrogen concentration mechanism.

In this embodiment the gaseous stream exiting the cell byway of port 38 is a mixture of $CO_2$ and $H_2$. The concentration of hydrogen in the exit stream 131 can be adjusted by controlling the current flowing through the electrochemical generator module 101 and the quantity of hydrogen entering the anode, which can be controlled by the blower speed. As the hydrogen concentration is decreased the energy consumption of the module 101 increases due to increasing over potentials. Eventually the over potential will increase and the anode side electrochemical reaction will shift to an oxygen generation process. The electrochemical process will shift from a $H_2$ concentration mechanism to a water electrolysis mechanism where $O_2$ is generated at the anode and $H_2$ is generated at the cathode.

Half-Cell Reactions that Can Occur

In order to take advantage of the increased solubility of carbon dioxide at higher pHs and reduced solubility of carbon dioxide at lower pHs the electrochemical cell, or system of electrochemical cells, can utilize a half reaction that generates hydrogen ions or consumes hydroxide ions in one electrochemical half-cell, and a half reaction that generates hydroxide ions or consumes hydrogen ions in a different half-cell. Examples of half reactions that can be used include:

$2H_2O + 2e^- \rightarrow 2OH + H_2$ $2OH + H_2 \rightarrow 2H_2O + 2e^-$  Half Reaction System 1

Net $E^0$ value: 0 V $O_2 + 2H_2O + 4e^- \rightarrow 4OH^-$ $4OH^- \rightarrow O_2 + 2H_2O + 4e^-$  Half Reaction System 2

Net $E^0$ value: 0 V $4H_2O + 4e^- \rightarrow 4OH^- + 2H_2$ $4OH^- \rightarrow O_2 + 2H_2O + 4e^-$  Half Reaction System 3

Net $E^0$ value: $-1.229$ V $O_2 + 2H_2O + 4e^- \rightarrow 4e^- \rightarrow OH^-$ $4OH^- + 2H_2 \rightarrow 4H_2O + 4e^-$  Half Reaction System 4

Net $E^0$ value: $1.229$ V $2H_2O + 2e^- \rightarrow 2OH^- + H_2$ $H_2 \rightarrow 2H^+ + 2e^-$ $H^+ + OH^- \rightarrow H_2O$  Half Reaction System 5

Net $E^0$ value: $-0.828$ V

Each of these half cell reaction systems, as well as others, which consume hydroxide ion or generate hydrogen ions at the anode (releasing free electrons) to release $CO_2$ can be integrated into the carbon dioxide capture/concentration system as described herein. In the case where hydrogen ions are generated they rapidly react with a carbonate or bicarbonate ion in the feed solution to release the absorbed $CO_2$. Each of these half cell reaction systems, as well as others, which generate hydroxide ions at the cathode (consumption of free electrons) to regenerate the absorbent solution can be integrated into a carbon dioxide capture/concentration system as described herein.

Preferred Reaction systems, such as half reactions systems 1 and 2, demonstrate low energy requirements, depending on such things as the throughput rate of the system and the materials of construction, the electrical input can be as low as about 20-250 kJ/mole $CO_2$, and in some cases as low as about 35-180 kJ/mole $CO_2$, or even as low as about 45 to 120 kJ/mole $CO_2$. These half reactions systems also have the advantage of not resulting in a large net production of explosive hydrogen gas.

Integration of Absorber and Electrochemical Cell with Algae/Microbe Production for Carbon Dioxide Capture and Sequestration The $CO_2$ capture and concentration system described herein can also be used to sequester carbon dioxide. In one embodiment, the concentrated carbon dioxide is fed to microorganisms in a bioreactor or photobioreactor. The microorganisms can be harvested and isolated, such as by burial in the earth's crust, with or without previously separating useful compounds such as oils, triglycerides, polysaccharides, proteins, amino acids, terpenes, xanthophyls, carotenoids, etc. In another embodiment, the carbon dioxide can be pressurized and isolated underground, or at the bottom of the ocean. In other embodiments, it is pumped underground as part of a petroleum or natural gas recovery system. In other embodiments the carbon dioxide is converted to another compound which is then isolated, such as in the earth's crust.

Utilization of $CO_2$ Captured and Released

The $CO_2$ released from the systems described herein can be used for any use for which $CO_2$ is otherwise used, and can include applications such as for storage, sequestration, as a chemical or biological feedstock, or other purposes as well. In some embodiments, sequestration can occur with placement of at least a portion of the $CO_2$ underground or underwater, on the ground, in tanks, or elsewhere so as to temporarily or permanently prevent the $CO_2$ from interacting with the carbon cycle, and includes use of $CO_2$ in gaseous, liquid, and solid forms as well as converted forms, such after conversion to biomass or biologically or chemically related material. In some embodiments, utilization of the $CO_2$ as a chemical feedstock can include using it for any purpose the chemical or physical properties of $CO_2$ are desirable, such as its reactivity or nonreactivity, and can include use in reaction systems, use to create a less or nonreactive environment, refrigeration, carbonation, pressurization, etc. In some embodiments, utilization of the $CO_2$ as a biological feedstock can include using it in relation to causing or facilitating growth, or retarding or inhibiting growth, or causing or facilitating changes in molecular pathways such as to increase production of biomass or a metabolite, decrease production of biomass or a metabolite, or change the production of one metabolite or type of biomass in relation to another, whether plant, animal, or microbe related. Some embodiments can include use in a storage system, an underground storage facility, sequestration systems of $CO_2$, fed to a bioreactor containing algae, fed to a greenhouse or agricultural zone, industrial concentration or liquefaction system, or other potential use of $CO_2$.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A method for generating $CO_2$, comprising:
   exposing a gas comprising $CO_2$ to an aqueous material comprising hydroxide ions and more than about 20% water and having a pH of about 8.5 or above, whereby at least a portion of the $CO_2$ is dissolved in the aqueous material;
   subjecting the aqueous material comprising the dissolved $CO_2$ to an electrical potential in an electrochemical cell, wherein the electrical potential oxidizes at least a portion of the hydroxide ions to water, wherein the electrochemical cell has a first electrochemical half-cell, a second electrochemical half-cell, and a proton exchange membrane, wherein the electrochemical cell has an electrical energy requirement for releasing the dissolved $CO_2$ as a gas and the electrical energy requirement for releasing the dissolved $CO_2$ is less than about 350 KJ/mole of $CO_2$; and
   releasing at least a portion of the dissolved $CO_2$.

2. The method of claim 1, wherein the proton exchange membrane separates an anode from a cathode.

3. The method of claim 1, wherein the aqueous material comprising the dissolved $CO_2$ is exposed to the electrical potential in the first electrochemical half-cell and the first half cell utilizes hydrogen and the second half cell generates hydrogen.

4. The method of claim 3, wherein the first half cell utilizes a first amount of hydrogen and the second half cell generates a second amount of hydrogen, and the first amount of hydrogen is within about 10% of the second amount of hydrogen.

5. The method of claim 1, wherein the second half-cell utilizes oxygen, and the first half-cell generates oxygen.

6. The method of claim 5, wherein the second half cell utilizes a first amount of oxygen and the first half cell generates a second amount of oxygen, and the first amount of oxygen is within 10% of the second amount of oxygen.

7. The method of claim 1, wherein the gas comprising $CO_2$ is obtained from at least one source selected from the group consisting of the atmosphere, a power plant, a boiler, a fermentation facility, an underground deposit, an oil well, a natural gas well, a petroleum refinery, a cement factory, an iron production facility, a steel production facility, a waste combustion facility, a chemical production facility, a metal production facility, and combinations thereof.

8. The method of claim 1, wherein half reactions take place in the first and second electrochemical cells, and the sum of the $E^0$ values for the half reactions is about 0.

9. The method of claim 1, wherein the electrochemical cell has an electrical energy requirement for releasing the dissolved $CO_2$ as a gas, wherein the electrical energy requirement is less than about 200 KJ/mole $CO_2$.

10. The method of claim 1, wherein the electrochemical cell has an electrical energy requirement for releasing the dissolved $CO_2$ as a gas, wherein the electrical energy requirement is less than about 100 KJ/mole $CO_2$.

11. The method of claim 1, wherein the released $CO_2$ is present in a gas phase at a concentration of greater than about 50% (vol.).

12. The method of claim 1, wherein the released $CO_2$ is present in a gas phase at a concentration of greater than about 80% (vol.).

13. The method of claim 1, wherein one of the first and second electrochemical half cells includes an anode, and half reactions take place in the electrochemical half cell which includes the anode, and during operation, the half reactions that take place in the electrochemical half cell whicn which includes the anode do not consist of:

$$H_2 \rightarrow 2H^+ + 2e^-.$$

* * * * *